(12) United States Patent
Peiker (10) Patent No.: US 7,817,436 B2
(45) Date of Patent: Oct. 19, 2010

(54) HOLDING APPARATUS FOR AN ELECTRONIC DEVICE

(76) Inventor: Andreas Peiker, Max-Planck-Strasse 32, 61381 Friedrichsdorf (DE)

( * ) Notice: Subject to any disclaimer, the term of this patent is extended or adjusted under 35 U.S.C. 154(b) by 888 days.

(21) Appl. No.: 11/675,828

(22) Filed: Feb. 16, 2007

(65) Prior Publication Data

US 2007/0206783 A1  Sep. 6, 2007

(30) Foreign Application Priority Data

| Feb. 17, 2006 | (DE) | ........................ 10 2006 007 837 |
| Mar. 8, 2006 | (DE) | ........................ 10 2006 011 044 |
| Jun. 27, 2006 | (DE) | ........................ 10 2006 029 782 |

(51) Int. Cl.
*H05K 7/16* (2006.01)
(52) U.S. Cl. ..................... 361/755; 379/446; 455/575.3
(58) Field of Classification Search ................. 361/755; 455/575.4, 575.3, 575.9; 379/446
See application file for complete search history.

(56) References Cited

U.S. PATENT DOCUMENTS

| 5,493,703 | A  * | 2/1996  | Yamashita ................ 455/575.9 |
| 5,940,502 | A  * | 8/1999  | Hirai et al. .................. 379/446 |
| 6,193,546 | B1 * | 2/2001  | Sadler ........................ 439/534 |
| 6,208,734 | B1 * | 3/2001  | Ortscheid et al. ........... 379/446 |
| 6,278,610 | B1 * | 8/2001  | Yasufuku et al. ............ 361/704 |
| 6,290,534 | B1 * | 9/2001  | Sadler ........................ 439/534 |
| 6,339,699 | B1 * | 1/2002  | Hirai et al. ................ 455/575.1 |
| 6,477,391 | B1 * | 11/2002 | Muramatsu et al. ....... 455/550.1 |
| D471,548  | S  * | 3/2003  | Zheng ........................ D14/253 |
| 6,760,569 | B1 * | 7/2004  | Chen .......................... 455/90.1 |
| 7,158,817 | B2 * | 1/2007  | Kubo ...................... 455/575.3 |
| 7,280,656 | B2 * | 10/2007 | Peiker ........................ 379/446 |
| 2002/0032041 | A1 * | 3/2002 | Hirai et al. .................. 455/557 |
| 2004/0206872 | A1 | 10/2004 | Peiker |
| 2006/0135227 | A1 * | 6/2006 | Chang et al. ............. 455/575.3 |

FOREIGN PATENT DOCUMENTS

| DE | 196 52 826 | 6/1998 |
| DE | 196 52 826 A1 | 6/1998 |
| DE | 198 17 345 | 10/1999 |
| DE | 10 2005 02553 | 10/2006 |
| EP | 0 182 720 | 5/1986 |
| EP | 1 286 246 | 2/2003 |
| EP | 1 440 849 | 7/2004 |
| WO | 03/019803 | 3/2003 |

\* cited by examiner

*Primary Examiner*—Dameon E Levi
(74) *Attorney, Agent, or Firm*—Burr & Brown (57) ABSTRACT

The invention relates to a holding apparatus for an electronic device, the holding apparatus including a stationary base body and a support, the support including an approximately rectangular accommodation space having longitudinal sides and transverse sides and at least one interface compatible with an interface of the electronic device. The interface is arranged on a longitudinal side of the accommodation space and the accommodation space is accessible from the opposing longitudinal side. The support is pivotable about a pivot axis oriented approximately parallel to the longitudinal sides of the accommodation space from a holding position to at least an insertion and removal position for the electronic device.

17 Claims, 10 Drawing Sheets

Fig. 17b

HOLDING APPARATUS FOR AN ELECTRONIC DEVICE

This application claims the benefit under 35 USC 119(a)-(d) of German Application No. 10 2006 007 837.3, filed Feb. 17, 2006, German Application No. 10 2006 011 044.7, filed Mar. 8, 2006, and German Application No. 10 2006 029 782.2, filed Jun. 27, 2006, the entireties of which are incorporated herein by reference.

FIELD OF THE INVENTION

The invention relates to a holding apparatus for an electronic device including a stationary base body and a support, the support including an approximately rectangular accommodation space having longitudinal and transverse sides and at least one interface compatible with an interface of the electronic device, wherein the interface is arranged on a longitudinal side of the accommodation space and the accommodation space is accessible from the opposing longitudinal side, and the support is pivotable about a pivot axis oriented approximately parallel to the longitudinal sides of the accommodation space from a holding position to at least an insertion and removal position for the electronic device.

BACKGROUND OF THE INVENTION

DE 196 52 826 A1 discloses a holding apparatus for an electronic device, the holding apparatus comprising a stationary base body and a support, the support being arranged on the base body such that it can pivot about a pivot axis, it being possible for the support to pivot in relation to the base body from a holding position for the electronic device to an insertion and removal position for the electronic device, the support having at least one interface which is compatible with an interface of the electronic device, the support having an approximately rectangular accommodation space, which has longitudinal sides and transverse sides, when seen in plan view. One disadvantage of this type of holding apparatus is that it cannot be used for novel flip telephones since its interface is not arranged at an end which is transverse to the longitudinal direction of the telephone but on a longitudinal side which runs parallel to the longitudinal direction of the telephone, for example.

SUMMARY OF THE INVENTION

The invention is based on the object of developing a holding apparatus for an electronic device that allows electronic devices with an interface arranged on a longitudinal side that runs parallel to a longitudinal direction of the electronic device to be held in a space-saving and secure manner.

This object is achieved by a holding apparatus comprising a stationary base body and a support, the support including an approximately rectangular accommodation space having longitudinal sides and transverse sides and at least one interface compatible with an interface of the electronic device, wherein the at least one interface is arranged on a longitudinal side of the accommodation space and the accommodation space is accessible from the opposing longitudinal side, and the support is pivotable about a pivot axis oriented approximately parallel to the longitudinal sides of the accommodation space from a holding position to at least an insertion and removal position for the electronic device.

The holding apparatus according to the invention has a pivot axis which is oriented approximately parallel to the longitudinal sides of the accommodation space, the interface of the support being arranged on one of the longitudinal sides of the accommodation space of the support, and the accommodation space being accessible from the longitudinal side which is opposite the interface. The holding apparatus of the present invention allows an electronic device that has an interface arranged on a longitudinal side which runs parallel to the longitudinal direction of the electronic device to be reliably held and contact-connected.

The invention also makes provision for at least regions of the electronic device to be accommodated in an interlocking manner by the longitudinal side regions of the support. This creates a holding apparatus that distributes the holding forces to a large number of regions of the electronic device and thus holds the electronic device in a gentle yet effective manner.

The invention also provides for at least one abutment area for the electronic device to be formed by a longitudinal wall, which supports the interface of the support. As a result, any excessive pressure produced when the electronic device is pushed onto the interface can be effectively absorbed by the abutment area. Overloading the interface of the holding apparatus with excessive pressure is therefore virtually precluded using this simple means.

According to the invention, provision is further made for at least one supporting area for the electronic device to be formed by a base area of the support. As a result of this supporting area, the electronic device is effectively supported when keys arranged on the upper face of the electronic device are operated while the electronic device is held in the holding apparatus.

According to the invention, provision is also made to arrange at least one latching element on the holding apparatus, which fixes the electronic device to the holding apparatus in the holding position of the support. As a result, the electronic device can be effectively prevented from becoming undesirably released from the holding apparatus.

It is particularly advantageous for the support to have three side walls in one embodiment of the present invention. In this configuration, the electronic device can be supported and protected in an optimum manner by these side walls.

According to the present invention, a holding apparatus which protects the electronic device particularly well is created by the support being in the form of a pocket-like compartment into which the electronic device is inserted.

In the case of a support which is in the form of a pocket, one embodiment of the present invention further provides for an opening or a window to be provided in the pocket in the region of a display of the electronic device.

According to the present invention, provision is also made for the support to be formed from a transparent material to allow the user to read or identify display elements of the electronic device even when the electronic device is held in the holding apparatus.

According to the invention, provision is made for the mobile telephone to be removed from the holding apparatus by moving the support to the insertion and removal position, and moving the mobile telephone in a direction opposite the contacting-making direction used to insert the mobile telephone. This reliably prevents the interfaces from being damaged.

The invention further provides for the electronic device to be in the form of a mobile telephone, and in particular in the form of a flip telephone, which comprises two halves that can be folded away from one another through at least 90° about a folding axis which is transverse to a longitudinal axis of the mobile telephone, or to be in the form of a slider telephone, which comprises two halves which can be displaced in relation to one another in the longitudinal direction of the mobile telephone in a separating plane which is situated parallel to an upper face or a lower face.

According to the present invention, provision is made for the holding apparatus to be embedded in a console. As a result, it is possible to produce a holding apparatus that is suitable for an existing environment and does not restrict the freedom of movement or entail any risk of injury.

The invention also makes provision for a contact plate to make contact with the holding apparatus in an interior space of a vehicle and for the holding apparatus to be fitted such that it is stationary. As a result, it is possible to directly transmit analog and/or digital signals to components arranged in the vehicle. Furthermore, the holding apparatus can be quickly replaced since removal of the holding apparatus does not require any laborious operations.

Finally, the invention provides for at least one electrical switch or an electrical pushbutton to be arranged on the base body of the holding apparatus. As a result, it is possible to directly initiate preprogrammed special functions using the holding apparatus.

BRIEF DESCRIPTION OF THE DRAWINGS

Further details of the invention are described in the drawing with reference to exemplary embodiments which are illustrated in a schematic and partially simplified manner. In the drawings:

FIG. 17a shows a side view of a sixth embodiment of a holding apparatus with a contact plate for the holding apparatus; and FIG. 17b shows a perspective view of the holding apparatus shown in FIG. 17a.

DETAILED DESCRIPTION OF THE INVENTION

Figure 1:
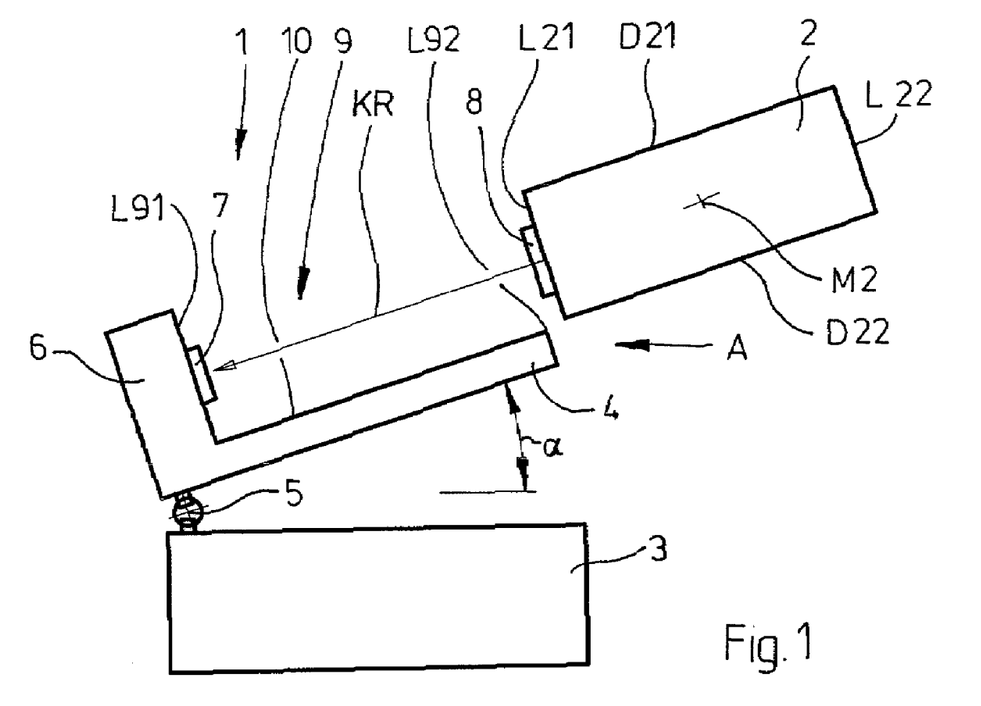
FIGS. 1-3 show a schematically illustrated side view of the holding apparatus in different positions together with an electronic device.
Figure 2:
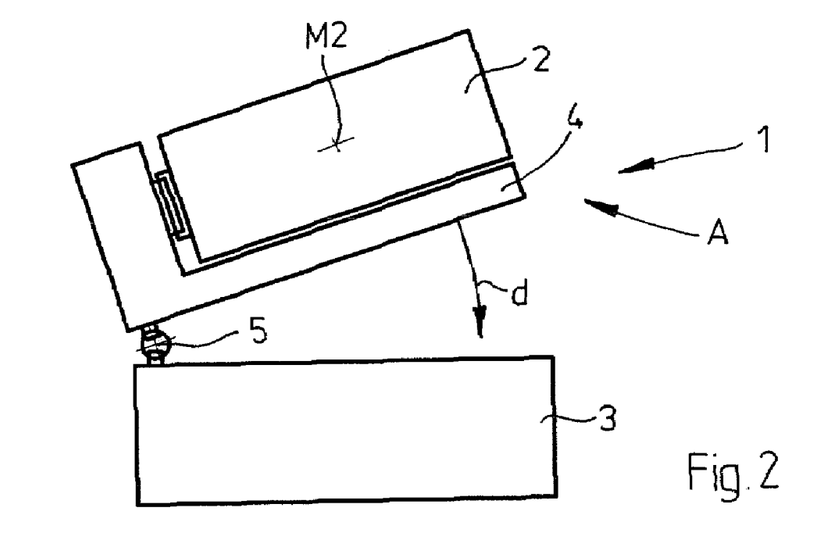
Figure 3:
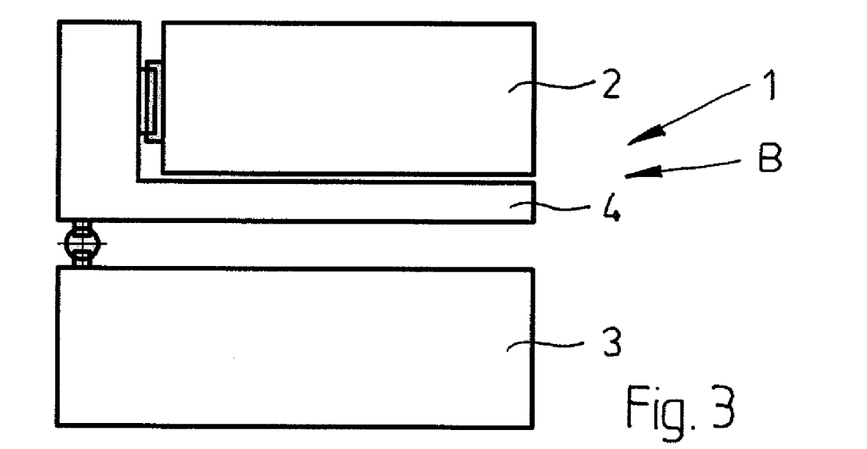
Figure 4:
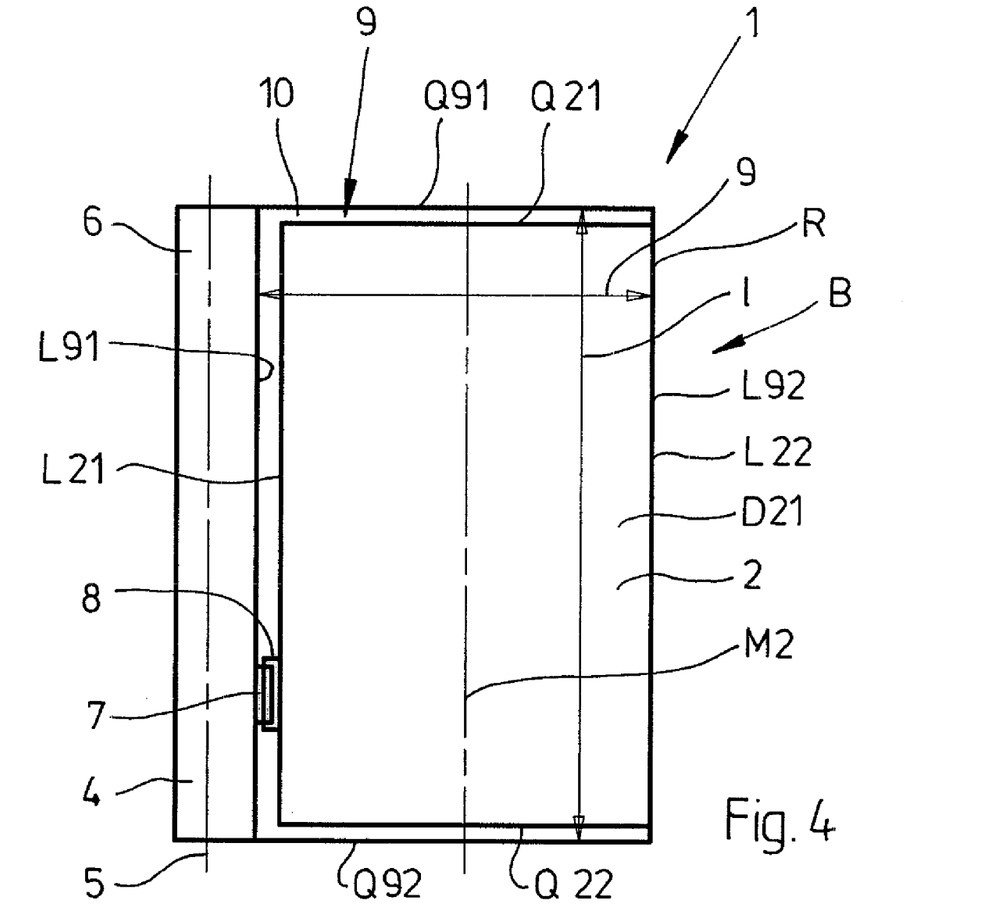
FIG. 4 shows a plan view of FIG. 3.

FIGS. 1 to 3 show a schematically illustrated holding apparatus 1 together with an electronic device 2 in different positions. The holding apparatus 1 comprises a base body 3 and a support 4, it being possible for the support 4 to pivot about a pivot axis 5 in relation to the base body 3. The pivot axis 5 allows support 4 to be positioned in an insertion and removal position A, as shown in FIGS. 1 and 2, respectively, and to also be positioned in holding position B, which is illustrated in FIG. 3. A pivot angle α between the insertion and removal position A and the holding position B is in a range of approximately 15° to 90°, and in particular α=35°. The support 4 has a longitudinal wall 6 which has interface 7 arranged on it to enable the electronic device 2 to make contact. The electronic device 2 is accordingly equipped with an interface 8 which is compatible with interface 7. For contact-making and fixing purposes, electronic device 2 is pushed onto support 4 in a contact-making direction KR. In FIG. 2, the support 4 is illustrated with the electronic device 2 completely pushed on (seated) in the support, with support 4 in insertion and removal position A. Support 4, together with electronic device 2, is then moved to holding position B, shown in FIG. 3, by pivoting support 4 in a pivoting direction d. Support 4 forms accommodation space 9 for electronic device 2 (see FIG. 1), with accommodation space 9 having two longitudinal sides L91 and L92 and two transverse sides Q91 and Q92 (see FIGS. 1 and 4). Longitudinal wall 6, together with interface 7 of holding apparatus 1 is located on longitudinal side L91 of accommodation space 9. Accommodation space 9 of the first embodiment of the present invention, as illustrated in FIGS. 1 to 4, is open toward longitudinal side L92 and transverse sides Q91 and Q92. Pivot axis 5 runs parallel to longitudinal sides L91 and L92 of accommodation space 9. Longitudinal sides L91 and L92 have a length l. Transverse sides Q91 and Q92 have a length q. In terms of lengths l and q, l>q and in particular l≅2×q. Accommodation space 9 of support 4 is therefore in the form of a rectangle R, as shown in the plan view of FIG. 4. Electronic device 2 has a longitudinal center axis M2 that is parallel to pivot axis 5 when electronic device 2 is being inserted, or is inserted, into holding apparatus 1. Interface 8 of electronic device 2 is arranged on longitudinal side area L21 of electronic device 2, longitudinal side area L21 being parallel to longitudinal center axis M2 and opposite longitudinal side area L22. Transverse side areas Q21 and Q22 of electronic device 2 are arranged parallel to transverse sides Q91 and Q92 of accommodation space 9 of holding apparatus 1. Upper side D21 and lower side D22 of electronic device 2 are oriented parallel to base area 10 of support 4 when electronic device 2 is contact-connected and fixed in holding apparatus 1.

Figure 5:
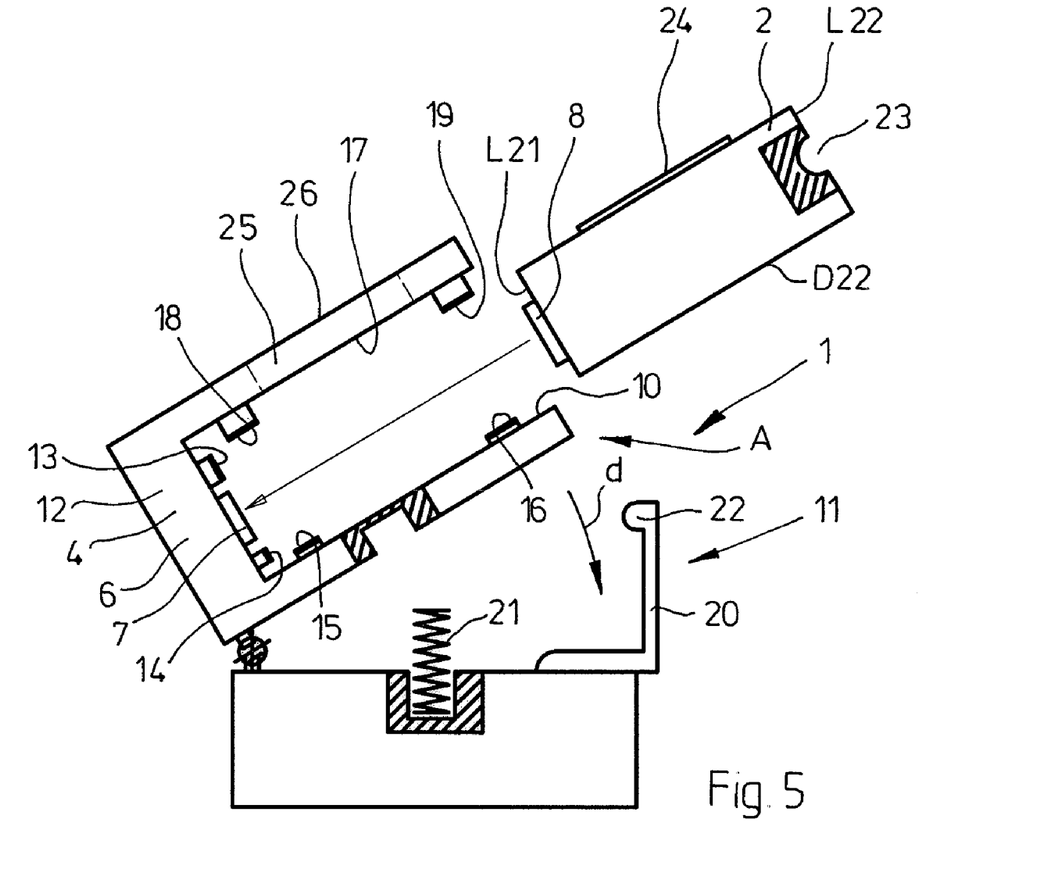
FIGS. 5 and 6 show illustrations of an alternative embodiment in a manner analogous to FIGS. 2 and 3.
Figure 6:
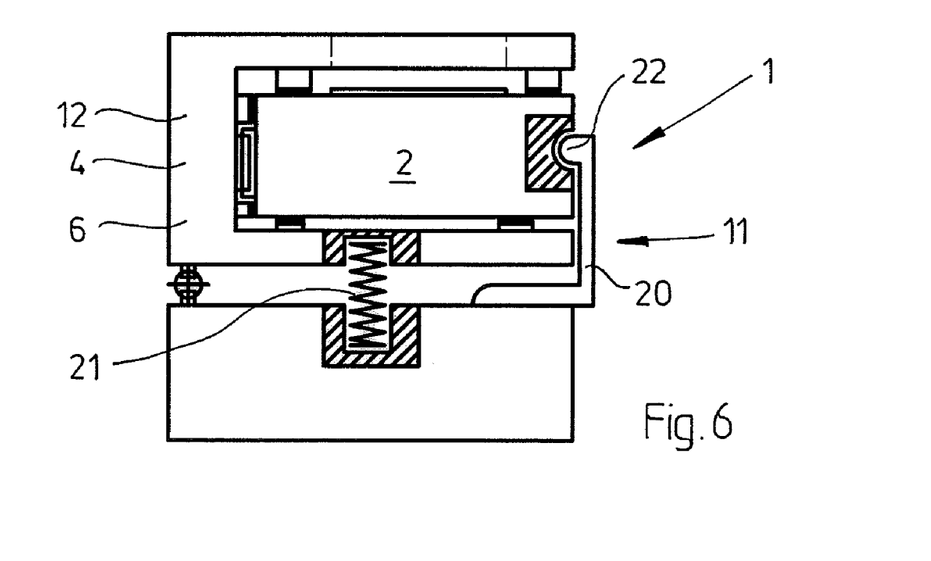

FIGS. 5 and 6 illustrate a second embodiment of holding apparatus 1 which differs from the first embodiment illustrated in FIGS. 1 to 4 substantially on account of latching element 11 and support 4 which is in the form of a compartment 12. Further, longitudinal wall 6 of support 4 forms abutment areas 13 and 14 for longitudinal side area L21 of electronic device 2. In contrast to the embodiment of FIGS. 1 to 4, supporting areas 15 and 16 for lower face D22 of electronic device 2 are formed by base area 10 of support 4. Further contact areas 18 and 19 are formed on ceiling area 17 of support 4 which is in the form of compartment 12, to direct interface 8 of electronic device 2 to interface 7 of support 4 without any offset. Latching element 11 is substantially formed by spring arm 20, which is fastened to base body 3 of holding apparatus 1, and helical spring 21 which is positioned between base body 3 and support 4. From position A, which is illustrated in FIG. 5, support 4 is pivoted toward base body 3 in pivoting direction d against the force of helical spring 21, with lug 22 of spring arm 20 snapping into recess 23, which is provided on longitudinal side area L22 of electronic device 2, in position B, as illustrated in FIG. 6. Holding apparatus 1 is then held in position B by spring arm 20 until spring arm 20 is manually withdrawn from recess 23 and helical spring 21 pushes support 4 back into position A, as shown in FIG. 5. In order for display apparatus 24 of electronic device 2 to be readable even when electronic device 2 is inserted into support 4, which is in the form of compartment 12, support 4 has an open aperture 25 and/or a window 26 above display apparatus 24. According to another embodiment of the present invention which is not illustrated, provision is made to operate pushbuttons of the electronic device through aperture 25.

Figure 7:
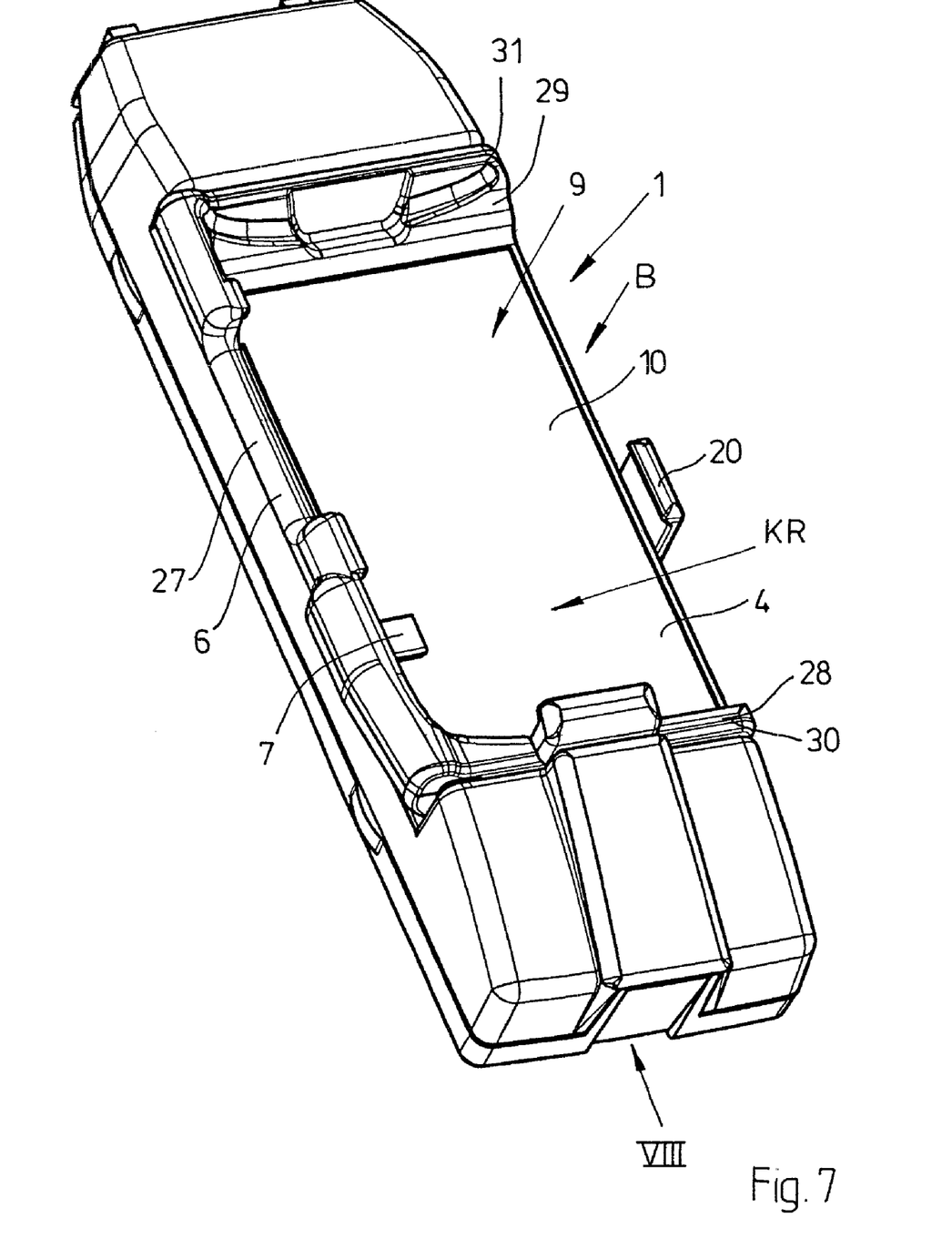
FIG. 7 shows a perspective view of a further holding apparatus in the holding position, without illustrating an electronic device.
Figure 8:
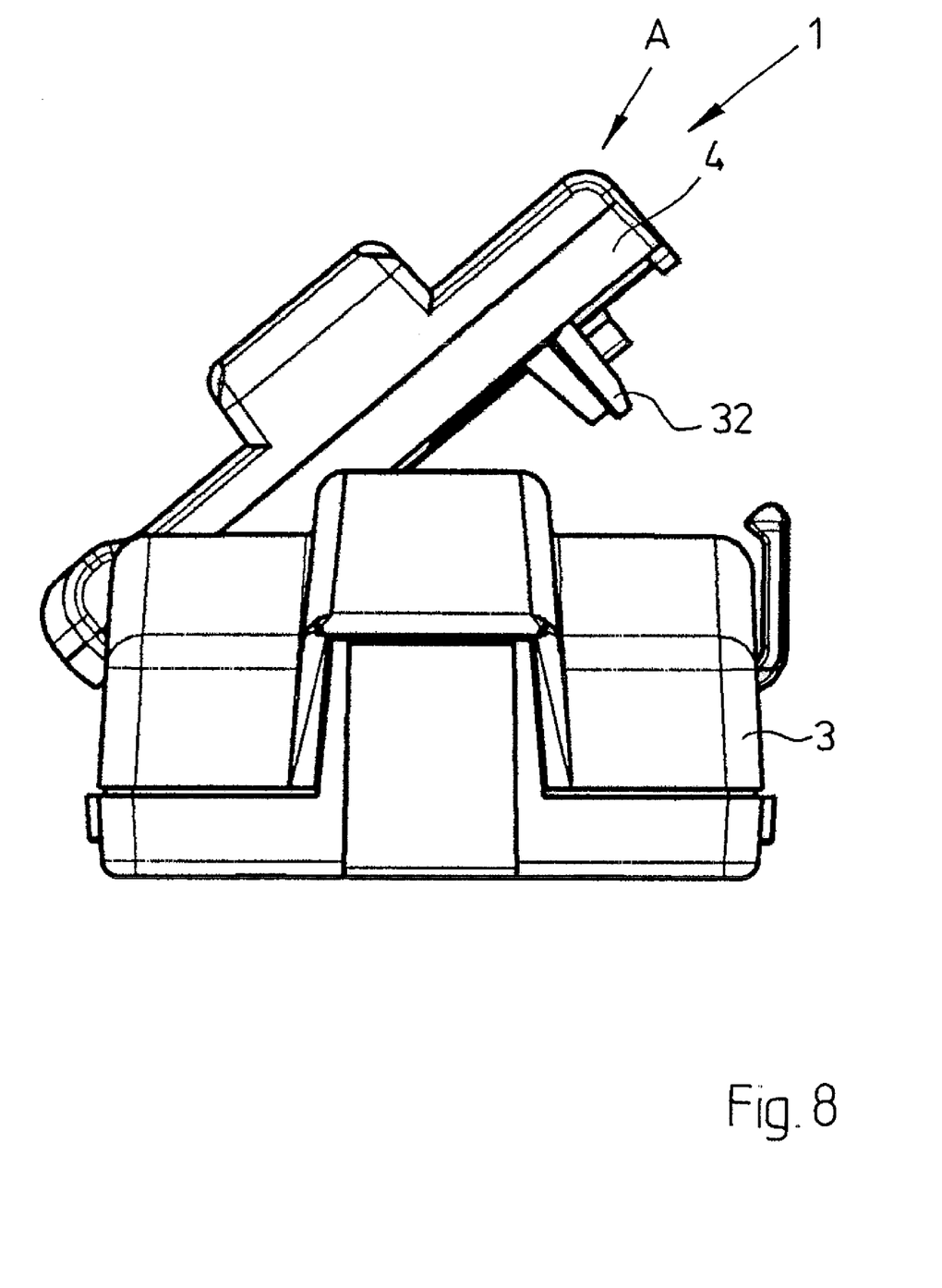
FIG. 8 shows a side view of the holding apparatus shown in FIG. 7 in the insertion and removal position.
Figure 9:
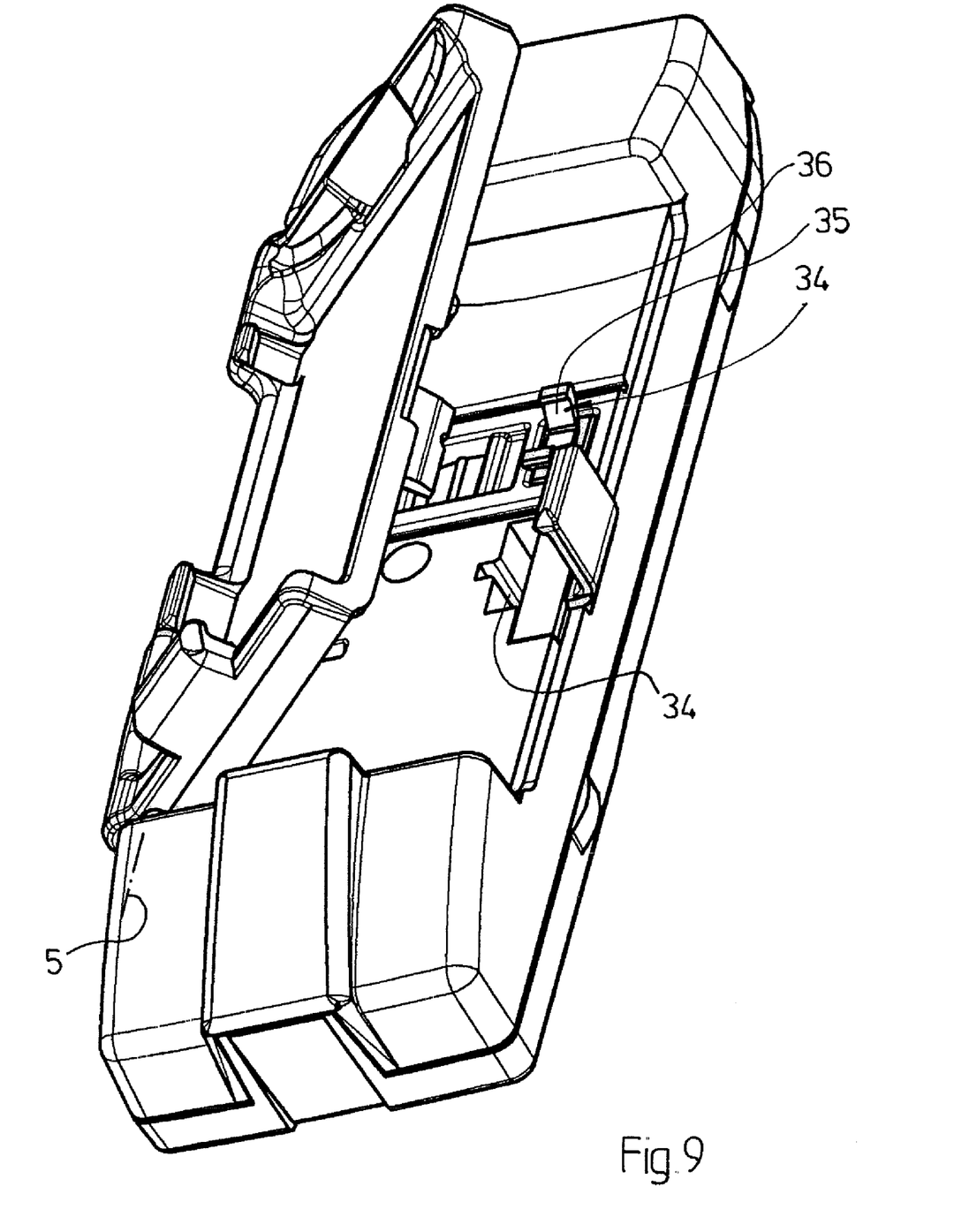
FIGS. 9 and 10 show perspective views of the holding apparatus in FIG. 8 from different viewing angles.
Figure 10:
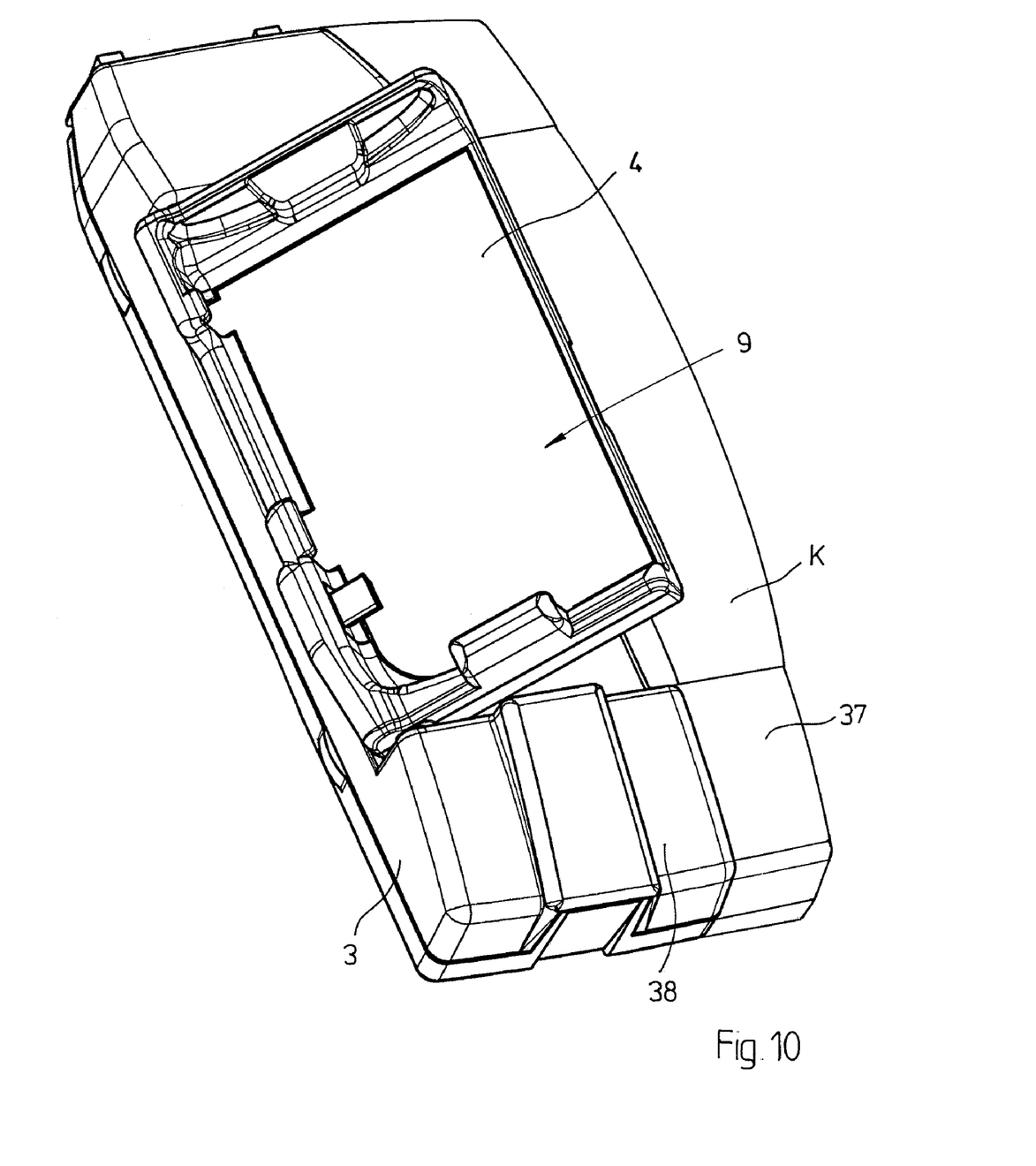

FIG. 7 illustrates a third embodiment of holding apparatus 1, with holding apparatus 1 positioned in holding position B, as shown in FIGS. 3, 4 and 6. Since no electronic device is inserted into holding apparatus 1 in FIG. 7, the view of accommodation space 9 which is formed by support 4 is clear. Accommodation space 9 is bounded by side walls 27, 28 and 29, side wall 27 being formed by longitudinal wall 6, and side walls 28, 29 being formed by transverse walls 30, 31. A spring arm 20 protrudes beyond base area 10 of support 4, spring arm 20 being provided to engage over an electronic device (not illustrated). In a manner analogous to the two embodiments illustrated in FIGS. 1 to 6, interface 7 is arranged on longitudinal wall 6 of support 4, it being possible for the interface of the electronic device (not illustrated) to be pushed onto interface 7 from contact-making direction KR when the holding apparatus is in insertion and removal position A, as shown in FIG. 8. FIG. 8 shows a view of the holding apparatus illustrated in FIG. 7 from an arrow direction VIII. FIG. 8 shows a web 32 on support 4, which is directed toward base body 3 of holding apparatus 1, web 32 being provided in order to enter shaft 34, which is visible in the perspective illustration of FIG. 9, and in this way to direct the movement of support 4 when the support is pivoted about the axis of rotation 5 on base body 3. FIG. 9 also shows a latching apparatus 34 which operates in accordance with the so-called push-push principle, that is to say clip 35 is alternately opened and closed when lug 36 is pressed in. Finally, FIG. 10 shows a further perspective view of the third embodiment illustrated in FIGS. 7 to 9. This illustration shows how the pivoting ability of support 4 enables an electronic device (not illustrated) to be inserted into accommodation space 9 even when base body 3 is embedded in a console K whose surface 37 is level with surface 38 of base body 3 and therefore prevents the mobile telephone (not illustrated) from being removed when support 4 is in holding position B, as shown in FIG. 7. This observation obviously applies to spring arm 20 which likewise prevents the electronic device (not illustrated) from being removed in position B.

Figure 11:
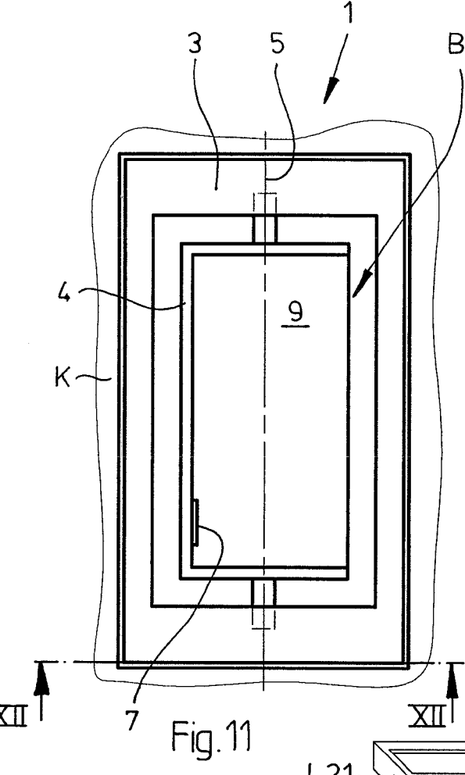
FIGS. 11-15 show a fourth embodiment of a holding apparatus in different illustrations.
Figures 12, 14, 15:
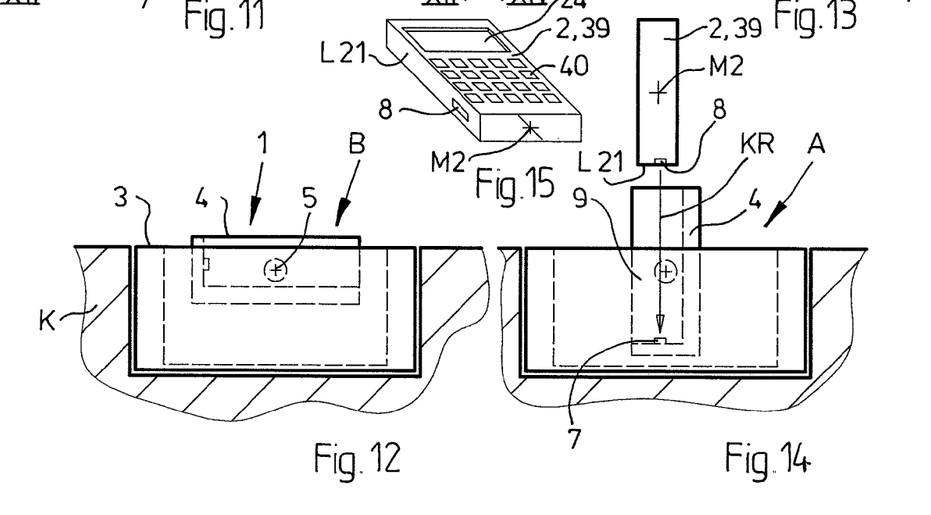
Figure 13:
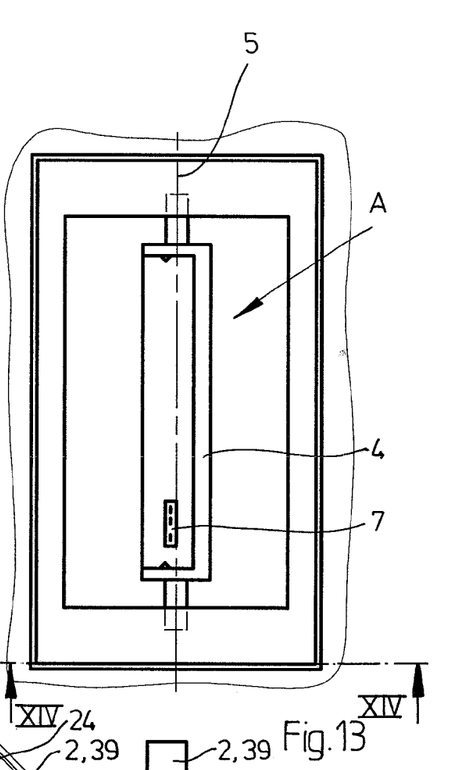

FIGS. 11 to 15 schematically illustrate a fourth embodiment of the holding apparatus 1. FIG. 11 shows a plan view of holding apparatus 1 with base body 3 and support 4, which can be pivoted or rotated about an axis of rotation 5. In FIG. 11, support 4 is in holding position B and an electronic device is not in accommodation space 9 of support 4. Holding apparatus 1 is embedded in a console 9, such as a center console of a vehicle, for example. This can be seen in particular from FIG. 12 which shows a section illustration along section line XII, shown in FIG. 11. FIGS. 13 and 14 illustrate holding apparatus 1 in insertion and removal position A, with FIG. 13 showing a plan view of holding apparatus 1 and FIG. 14, in a manner which is analogous to FIG. 12, showing a section illustration along section line XIV. In position A of holding apparatus 1 or of support 4, the support is pivoted through 90° about the axis of rotation 5, and electronic device 2 which is designed as a mobile telephone 39 can be inserted into the accommodation space in support 4 in contact-making direction KR from above in the vertical direction. In the process, interface 8 of mobile telephone 39 meets interface 7, which is arranged on support 4. Interface 8 of mobile telephone 39 is located on longitudinal side area L21 of the mobile telephone, which is parallel to longitudinal center axis M2 of mobile telephone 39. In order to clearly show the position of interface 8 on electronic device 2 or mobile telephone 39, FIG. 15 shows a perspective illustration of mobile telephone 39 with further details such as display apparatus 24 and keys 40. The fourth embodiment of the present invention, as shown in FIGS. 11 to 15, illustrates that holding apparatus 1 is suitable for accommodating mobile telephones with a special arrangement of the interface on a longitudinal side area and for integrating the holding means in a console.

Figure 16:
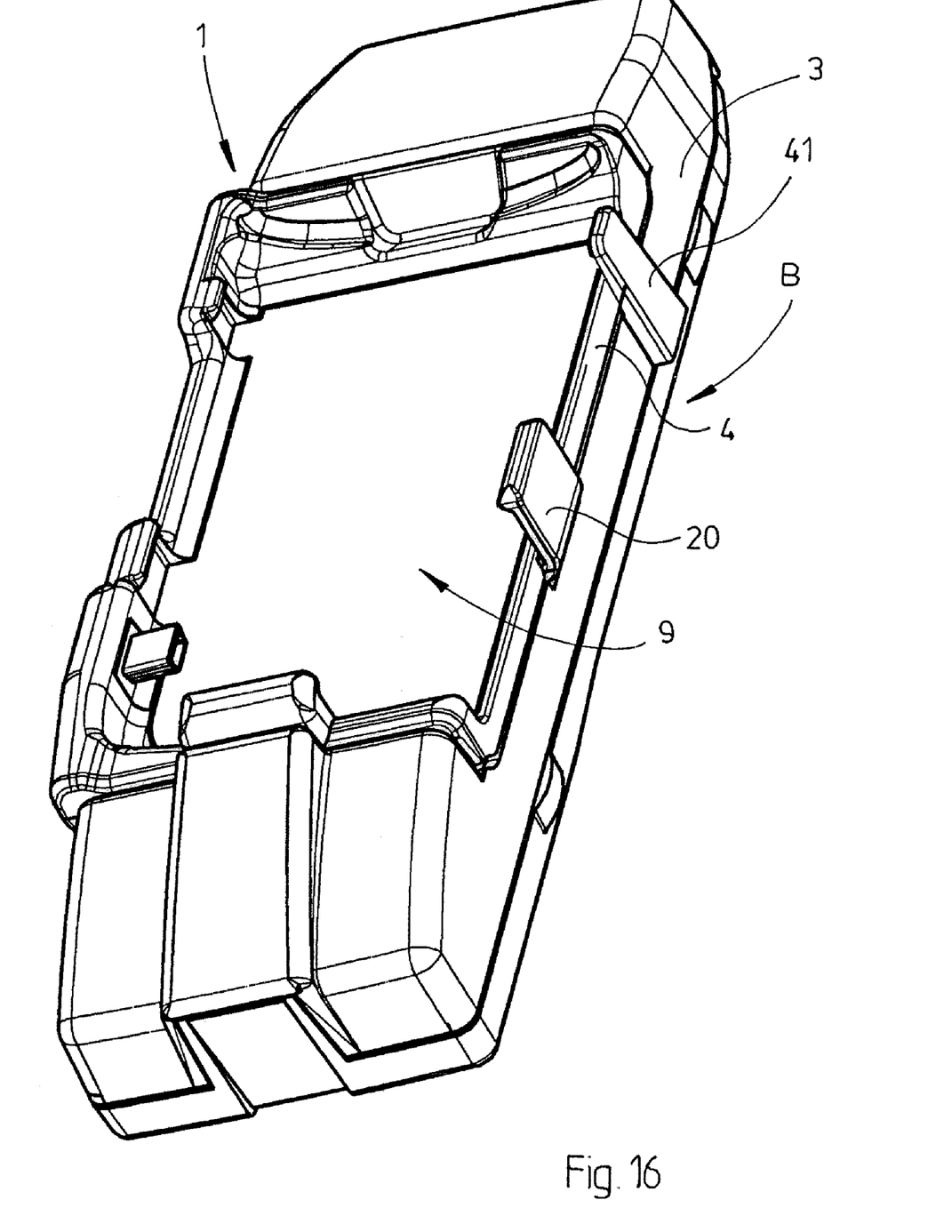
FIG. 16 shows a perspective view of a fifth embodiment of a holding apparatus.

FIG. 16 illustrates a fifth embodiment of holding apparatus 1, the design of the holding apparatus largely corresponding to the design of the holding apparatus shown in FIGS. 7 to 10. Holding apparatus 1 is illustrated in FIG. 16 in holding position B, as is known from FIG. 7. Since there is no electronic device in accommodation space 9 in holding apparatus 1, as illustrated in FIG. 16, the view of support 4 which forms accommodation space 9 is clear. Compared to the embodiments shown in FIGS. 7 to 10, accommodation space 9 is bounded at the sides by an additional clip 41. Clip 41 is in the form of a stop, which protects pivotable support 4 and possibly the electronic device in accommodation space 9 against lateral forces which occur in the vehicle. In particular, clip 41 serves to relieve the load on spring arm 20. Clip 41 is integrally formed with base body 3 of holding apparatus 1 or is firmly connected to the latter. The invention also makes provision for a plurality of clips to be arranged next to one another.

Figures 17A, 17B:
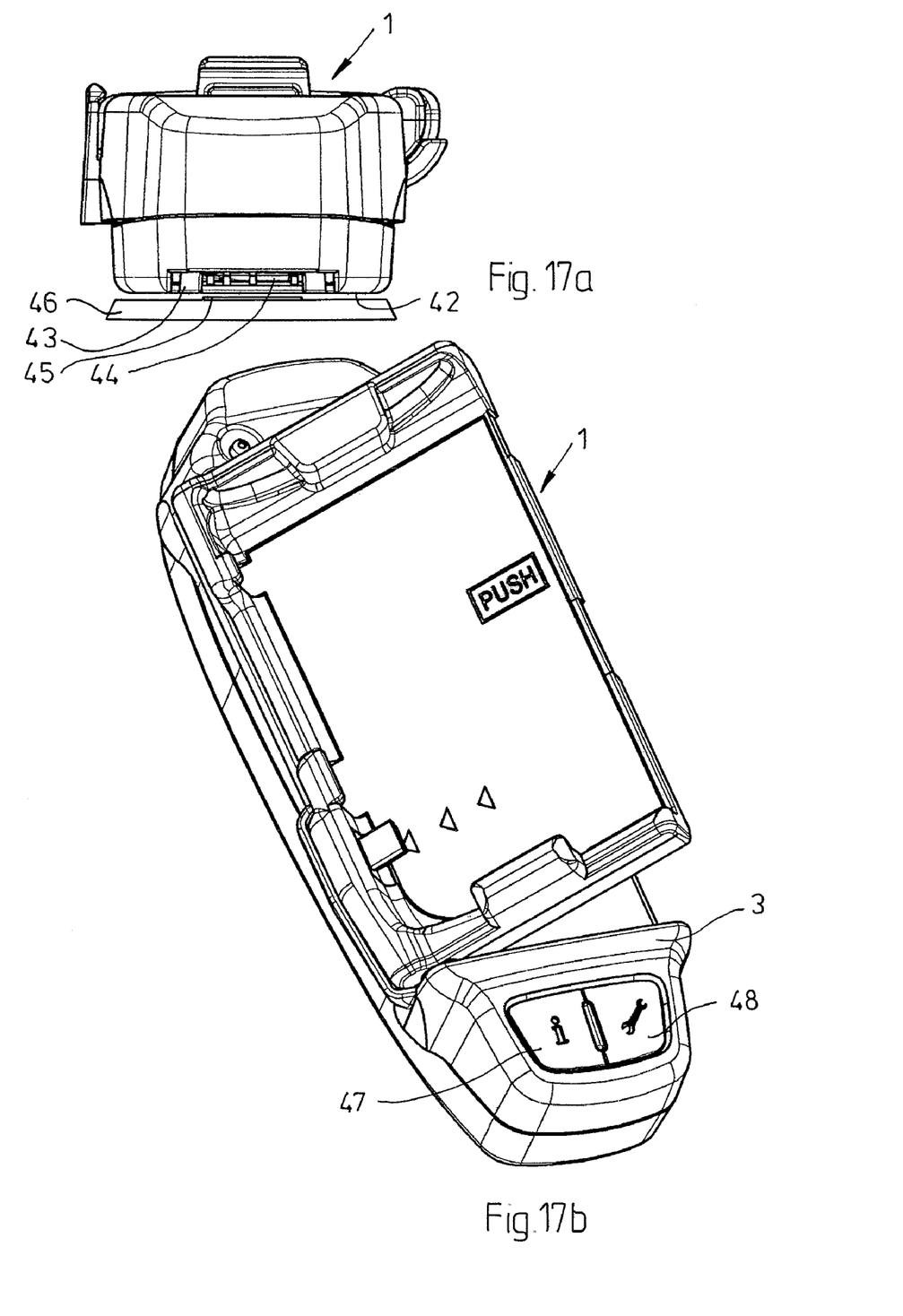

FIG. 17a illustrates a sixth embodiment of a holding apparatus 1, the design of the holding apparatus largely corresponding to the design of the holding apparatus shown in FIGS. 7 to 10. In FIG. 17a, holding apparatus 1 is illustrated in a side view. On lower face 42, holding apparatus 1 has a recess 43 containing an interface 44. Lower face 42 of holding apparatus 1 can be positioned on interface 45 of contact plate 46. Holding apparatus 1 can also be locked to contact plate 46 and analog and/or digital signals can be transmitted via the interacting interfaces 44 and 45.

FIG. 17b shows a perspective view of holding apparatus 1 shown in FIG. 17a. Two electrical pushbuttons 47 and 48, by means of which predefined special functions of the electronic device (not illustrated) can be called up, are arranged on base body 3 of holding apparatus 1.

The invention is not restricted to illustrated or described exemplary embodiments. Rather, it comprises developments of the invention within the scope of the patent claims.

LIST OF REFERENCE SYMBOLS

1 Holding apparatus
2 Electronic device
3 Base body of 1
4 Support of 1
5 Pivot axis between 3 and 4
6 Longitudinal wall of 4
7 Interface at 4
8 Interface at 2
9 Accommodation space of 4
10 Base area of 4
11 Latching element
12 Compartment
13 Abutment area formed by 6
14 Abutment area formed by 6
15 Supporting area formed by 10
16 Supporting area formed by 10
17 Ceiling area of 12
18 Contact area formed by 17
19 Contact area formed by 17
20 Spring arm
21 Helical spring
22 Lug of 20
23 Recess
24 Display apparatus of 2
25 Aperture in 12

26 Window in 12
27 Side wall of 4
28 Side wall of 4
29 Side wall of 4
30 Transverse wall of 4
31 Transverse wall of 4
32 Web at 4
33 Shaft in 3
34 Latching apparatus
35 Clip
36 Lug
37 Surface of K
38 Surface of 3
39 Mobile telephone
40 Key of 39
41 Clip
42 Lower face of 1
43 Recess in 42
44, 45 Interface at 42 and 46
46 Contact plate
47, 48 Electrical pushbuttons
α Pivot angle
L91 Longitudinal side of 9
L92 Longitudinal side of 9
Q91 Transverse side of 9
Q92 Transverse side of 9
KR Contact-making direction
d Pivoting direction
l Length of L91 and L92
q Length of Q91 and Q92
R Rectangle
K Console
M2 Longitudinal center axis of 2
D21 Upper face of 2
D22 Lower face of 2
L21 Longitudinal side area of 2
L22 Longitudinal side area of 2
Q21 Transverse side area of 2
Q22 Transverse side area of 2
A Insertion position or removal position of 4 and 1
B Holding position of 4 and 1

What is claimed:

1. An electronic device holding system comprising:
   an electronic device having a substantially rectangular shape defined by longitudinal sides and transverse sides, wherein a length of the longitudinal sides is greater than a length of the transverse sides, said electronic device comprising at least one interface on a longitudinal side thereof;
   a holding apparatus comprising
      a stationary base body; and
      a support arranged on the base body, said support having a longitudinal wall that at least partially defines a substantially rectangular accommodation space for receiving said electronic device, said space having a longitudinal length that is greater than a transverse length thereof, and an interface on said longitudinal wall of the support that is compatible with said at least one interface on the longitudinal side of said electronic device,
      wherein the support is pivotably joined to the base body about a pivot axis that is oriented substantially parallel to the longitudinal wall of the support, such that the support is pivotable between a retracted position for holding the electronic device and an insertion/removal position for inserting/removing the electronic device from the support.

2. The electronic device holding system according to claim 1, wherein the longitudinal side on which the interface is arranged forms at least one abutment area for the electronic device.

3. The electronic device holding system according to claim 1, wherein the support has a base area that forms at least one supporting area for the electronic device.

4. The electronic device holding system according to claim 1, further comprising at least one latching element by means of which the electronic device can be secured to the holding apparatus in the retracted position of the support.

5. The electronic device holding system according to claim 1, wherein the support has three side walls.

6. The electronic device holding system according to claim 1, wherein the accommodation space has an aperture or a window for a display apparatus of the electronic device.

7. The electronic device holding system according to claim 1, wherein the support is formed from a transparent material.

8. The electronic device holding system of claim 1, wherein the electronic device is inserted into the accommodation space of the support along a movement direction that is perpendicular to the longitudinal sides of the electronic device.

9. The electronic device holding system according to claim 1, wherein the electronic device is a mobile telephone.

10. The electronic device holding system according to claim 9, wherein the mobile telephone is in the form of a flip telephone.

11. The electronic device holding system according to claim 9, wherein the mobile telephone is in the form of a slider telephone.

12. The electronic device holding apparatus system according to claim 1, wherein the holding apparatus is embedded in a console.

13. The electronic device holding system according to claim 1, further comprising a contact plate that makes contact with the holding apparatus and locks the holding apparatus into place.

14. The electronic device holding system according to claim 1, further comprising at least one of an electrical switch and an electrical pushbutton arranged on the base body of the holding apparatus.

15. The electronic device holding system according to claim 8, wherein the electronic device is removed from the holding apparatus by movement in a direction opposite the insertion direction when the support is in the insertion/removal position.

16. The electronic device holding system of claim 1, wherein the longitudinal length of the accommodation space is approximately twice the transverse length of the accommodation space.

17. The electronic device holding system of claim 4, wherein the electronic device further comprises a recess on the longitudinal side thereof that is opposite to the longitudinal side having said at least one interface, and the latching element engages the recess.

* * * * *